United States Patent
Muckel et al.

(10) Patent No.: US 11,580,313 B1
(45) Date of Patent: *Feb. 14, 2023

(54) TRANSLATION AND COMMUNICATION FILTERS FOR SOCIAL INTERACTION

(71) Applicant: SONY INTERACTIVE ENTERTAINMENT LLC, San Mateo, CA (US)

(72) Inventors: Johannes Muckel, San Mateo, CA (US); Ellana Fortuna, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,349

(22) Filed: Aug. 25, 2021

(51) Int. Cl.
| | |
|---|---|
| G06F 15/16 | (2006.01) |
| G06F 40/58 | (2020.01) |
| H04L 51/04 | (2022.01) |
| H04L 67/306 | (2022.01) |

(52) U.S. Cl.
CPC .............. G06F 40/58 (2020.01); H04L 51/04 (2013.01); H04L 67/306 (2013.01)

(58) Field of Classification Search
None
See application file for complete search history.

(56) References Cited

U.S. PATENT DOCUMENTS

2014/0244235 A1* 8/2014 Michaelis ........... H04L 12/1827
704/2

* cited by examiner

*Primary Examiner* — Wing F Chan
*Assistant Examiner* — Andrew Woo
(74) *Attorney, Agent, or Firm* — Polsinelli LLP

(57) ABSTRACT

Systems and methods for profile-based language translation and filtration are provided. A user language profile specifying one or more translation rules may be stored in memory for a user. A current communication session associated with a user device of the user may be monitored. The current communication session may includes messages from one or more other user devices of one or more other users. A language set in at least one of the messages of the current communication session may be detected as triggering at least one of the translation rules in real-time. The language set in the at least one message may further be filtered in real-time based on the at least one translation rule, which may thereby modify the at least one message. Further, a presentation of the current communication session that is provided to the user device may be modified to include the filtered language set of the modified message instead of the triggering language set.

15 Claims, 5 Drawing Sheets

TRANSLATION AND COMMUNICATION FILTERS FOR SOCIAL INTERACTION

BACKGROUND OF THE INVENTION

1. Field of the Invention

The present invention generally relates to translation and communication filters. More specifically, the present invention relates to translation and communication filters for social interactions in digital content networks.

2. Description of the Related Art

Presently available digital content networks may span the globe and therefore involve communication in a variety of different languages. A user playing during a gameplay session of a multiplayer game title may encounter other users who communicate in different languages. Such communication may include voice-based chat, text-based chat, video-based chat, etc., and take place on one or more different platforms (e.g., game platform server and separate chat server). When combined with the variety of languages, the variety of different chat types and platforms may further exacerbate barriers to communication and interaction among the current users of a session of an interactive content title.

Where the interactive content title is a game title, yet further obstacles may be presented. For example, in-game events in the virtual or digital environment of the game may be occurring at the same time that communications are exchanged among the users. A user may therefore wish to pay attention, particularly where the in-game event is significant or otherwise impactful on gameplay success. Having to split their attention in order to request or otherwise find a way to understand real-time communications may be a distraction to gameplay, while delaying the translation may result in the user never obtaining an understanding of what was communicated. Thus, opportunities for finding compatible or interesting peers and otherwise further engaging in social interactions may be lost.

In addition to simple language differences, there may be other circumstances where language creates barriers or other undesirable communication experiences. For example, a new player may be unfamiliar with a specific interactive content title (or gaming in general) and may therefore not understand certain references to specific content titles, characters, back stories, gaming practices, jargon, slang, etc. Another example may include players who may not wish to expose themselves to profanity, graphic content, bullying language, misgendering language, or other aggressive, hostile, or violent language (e.g., harassment, threats). In particular, young players (e.g., children) may have parents, guardians, or other supervisors (e.g., relatives, child-care professionals) who wish to limit their charge's exposure to such language.

There is, therefore, a need in the art for improved systems and methods of translation and communication filters for social interactions in digital content networks.

SUMMARY OF THE CLAIMED INVENTION

Embodiments of the present invention include systems and methods for profile-based language translation and filtration are provided. A user language profile specifying one or more translation rules may be stored in memory for a user. A current communication session associated with a user device of the user may be monitored. The current communication session may includes messages from one or more other user devices of one or more other users. A language set in at least one of the messages of the current communication session may be detected as triggering at least one of the translation rules in real-time. The language set in the at least one message may further be filtered in real-time based on the at least one translation rule, which may thereby modify the at least one message. Further, a presentation of the current communication session that is provided to the user device may be modified to include the filtered language set of the modified message instead of the triggering language set.

DETAILED DESCRIPTION

Embodiments of the present invention include systems and methods for profile-based language translation and filtration are provided. A user language profile specifying one or more translation rules may be stored in memory for a user. A current communication session associated with a user device of the user may be monitored. The current communication session may includes messages from one or more other user devices of one or more other users. A language set in at least one of the messages of the current communication session may be detected as triggering at least one of the translation rules in real-time. The language set in the at least one message may further be filtered in real-time based on the at least one translation rule, which may thereby modify the at least one message. Further, a presentation of the current communication session that is provided to the user device may be modified to include the filtered language set of the modified message instead of the triggering language set.

Figure 1:
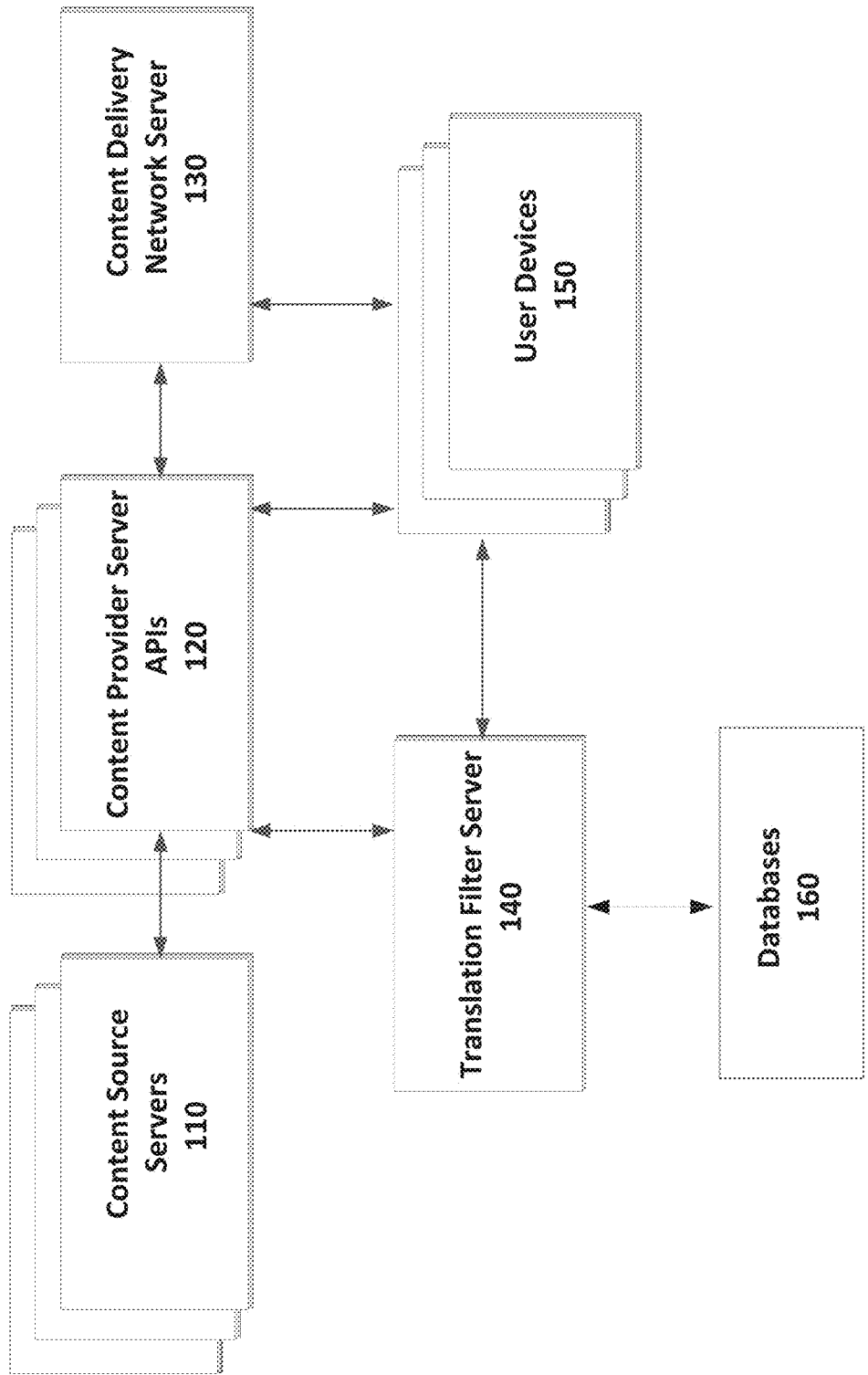
FIG. 1 illustrates a network environment in which a system for profile-based language translation and filtration may be implemented.

FIG. 1 illustrates a network environment in which a system for profile-based language translation and filtration may be implemented. The network environment 100 may include one or more content source servers 110 that provide digital content (e.g., games, other applications and services) for distribution, one or more content provider server application program interfaces (APIs) 120, content delivery network server 130, a translation filter server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, translation filter server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Translation filter server 140 may include any data server known in the art that is capable of communicating with the different content source servers 110, content provider server APIs 120, content delivery network server 130, user devices 150, and databases 160. Such translation filter server 140 may be implemented on one or more cloud servers that carry out instructions associated with interactive content (e.g., games, activities, video, podcasts, User Generated Content ("UGC"), publisher content, etc.). The translation filter servers 140 may further carry out instructions, for example, for consolidating communication session messages, filtering the messages based on a specific user profile (including translations and content modifications), and modifying a presentation of the communication session messages based on the filtering.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

While pictured separately, the databases 160 may be stored on any of the servers and devices illustrated in network environment 100 on the same server, on different servers, or on any of the user devices 150. Such databases 160 may store or link to various dictionaries and other translation sources used for translation. In addition, databases 160 may store user language profiles, as well as translation models that may be specific to a particular user, user group or team, user category, game title, game genre, language category, etc. One or more user language profiles may also be stored in the databases 160 for each user. In addition to gameplay data regarding the user (e.g., user progress in an activity and/or media content title, user ID, user game characters, etc.), the user language profile may include a set of translation rules specific to the user.

Exemplary translation rules for the user may specify certain trigger conditions and associated translation actions. For example, a trigger condition may be include detecting use of a language that does not match the language(s) associated with the user of the user language profile (e.g., designated as preferred language(s)), and a corresponding translation action may include translating the detected language into one of the user's preferred languages. In a communication session that involves multiple players each speaking different languages, therefore, each player may speak or text in their respective native language(s), but may be presented with different versions of the chat stream that has been translated in accordance with their respective user language profiles. Thus, a chat stream that may include multiple different languages in unmodified, unfiltered form may be transformed into different versions of different languages (or different sets of languages) sent to each user device in accordance with their respective user language profiles.

In addition to pure language translation, the translation rules may further specify translations for specialized (e.g., game-specific) terms, phrases, or references. For example, a player who is new to a particular game title may request or opt for expanded or explanatory translations as part of a designated translation action, whereby references to specific players, game characters, locations, or other in-game objects, etc., may be identified as trigger conditions that are associated with translation actions that provide definitions, back stories and other background data, combo explanations, links to more resources, etc., in context with the rest of the communication stream. Thus, a chat stream involving users of different experience levels may be transformed to include different types and extents of annotations based on the experience level of the respective user. Such definitions and explanations may also be provided for general game-related terms and phrases, as well as those that are platform-specific, hardware-specific, content title-specific, content genre-specific, user-specific, group- or team-specific, or other specialized lexicons.

In addition to translation rules that result in adding more content to the messages in a chat stream, a user language profile may further include translation rules that may result in removing or otherwise modifying the messages in the chat stream. Some users (or parents, guardians, supervisors, etc., of the users) may wish to avoid exposure to certain types of language, including profanity, graphic content, bullying language, misgendering language, or other aggressive, hostile, or violent language (e.g., harassment, threats). Thus, the trigger conditions defined by the translation rules may include various terms, phrases, and indicators of such language or content, while the associated trigger actions may include removing (e.g., deleting, muting, bleeping) or modifying (e.g., blurring, blocking/blacking-out, auto-correcting or replacing with alternative language, emoji, or graphics) the triggering language from the chat stream presentation provided to the user.

In some instances, a user may choose to censor themselves when customizing the translation rules of their own user language profile. For example, the user may specify that certain audiences (e.g., players in young age ranges) be prevented from seeing, hearing, or accessing certain types of content generated by the user. As such, the trigger conditions may include parameters characterizing the other users and different ranges associated with different trigger actions.

Other trigger conditions may specify other circumstances for removing language from the chat stream. For example, chat streams that may include numerous other users communicating at the same time may overwhelm the user. The user may therefore specify trigger conditions corresponding to certain thresholds of message volume, at which point the associated translation action may automatically filter out certain categories of messages from the chat stream presentation provided to the user device. For example, the user may specify different categories of users (e.g., friends, teammates, current session players, favorites, trusted users, etc.) to prioritize over others in implementing the translation actions. Thus, a chat stream may be distilled for the user based on application of the translation rules in the associated user language profile. Such distilled chat stream may include messages only from the prioritized group(s) of users.

In some embodiments, the associated translation action may further include identifying a user who is the source of the triggering language (e.g., a specific player or spectator) and automatically adding the identified user to a block list or initiating another form of punishment or intervention (e.g., blocking further access to gameplay session or platform, requiring remedial training as prerequisite to regaining gameplay privileges). Some implementations of the trigger conditions may include a predetermined number of permitted uses (e.g., three strikes) before the identified user is blocked or other punishment or intervention imposed. As such, each detected use of triggering language may be counted against the predetermined number and result in an update in the current status of the trigger condition (e.g., second strike out of three).

Some embodiments may further provide for translation into different mediums or types of presentation. Different users may have different preferences for how they wish to communicate and receive communications. For example, some users prefer to read text-based messages, while others prefer to listen to audio messages. Further, the same user may also prefer text-based messages in some circumstances, while also preferring audio messages under different circumstances. For example, the user may wish to devote their attention to in-game events currently on display and may therefore not wish the on-screen display to be obscured or to have to look off-screen to communicate. Trigger conditions associated with the in-game events may therefore be defined by translation rules and associated with actions for translating any text-based messages to audio. Alternatively, the user may be unable to distinguish voices when numerous other users are talking at once or when on-screen events are particularly noisy. The user may therefore define trigger conditions for a predetermined number of concurrent speakers or predetermined volume/decibel level, whereby the associated translation rules may include transcribing the spoken messages.

Different combinations of the translation rules (and associated trigger conditions and translation actions) may be stored in the user language profile for each user. Collectively, therefore, the set of translation rules included in a user language profile provides for custom translations, filtering, and presentation for the specific user. The customization may further be based on current session conditions (e.g., current gameplay status, current game title, current in-game conditions). Because each chat stream presentation is personalized to the specific user based on their respective user language profile, a chat stream involving multiple different users may be translated and filtered to result in as many different versions of the chat stream as there are users.

In exemplary implementations, a current communication session involving multiple users may be monitored by translation filter server 140 in accordance with the respective user language profiles associated with each of the users. In monitoring for a particular user, the translation filter server 140 may detect in real-time that a language set in at least one of the messages of the current communication session triggers at least one of the translation rules in the user language profile for that user. Such detection may be based on the language set meeting one or more trigger conditions specified by the translation rule. The translation filter server 140 may then filter the language set in the at least one message in real-time based on a translation action specified by the triggered translation rule. Such translation action may result in modifying the at least one message based on the filtered language set. Further, translation filter server 140 may modify a presentation of the current communication session that is provided to the user device of the particular user. The presentation of the current communication session may be modified to include the filtered language set of the modified message instead of the triggering language set.

Figure 2:
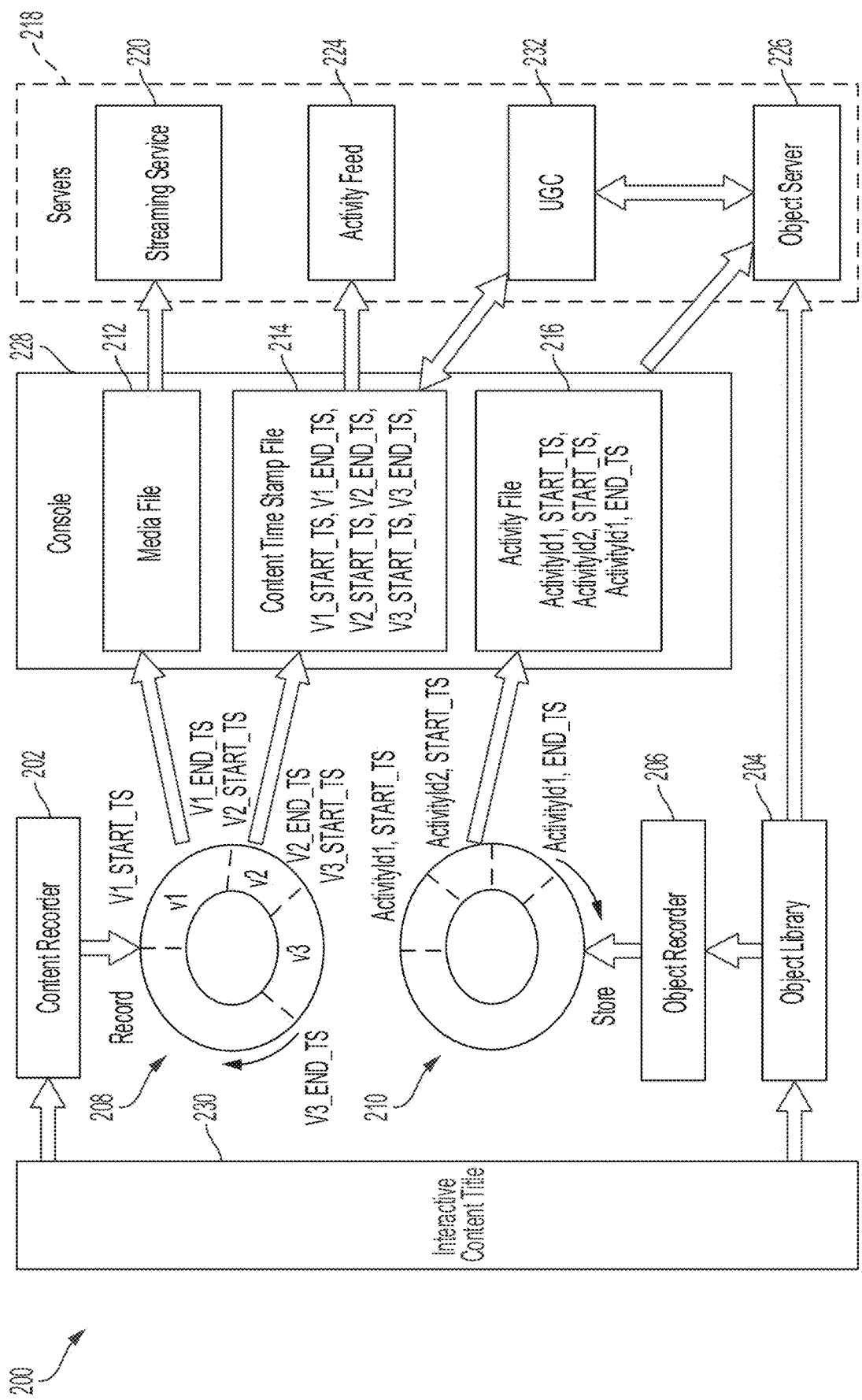
FIG. 2 illustrates an exemplary uniform data system (UDS) that may be used to provide data to a system for profile-based language translation and filtration.

FIG. 2 illustrates an exemplary uniform data system (UDS) 200 that may be used to provide data to a system for profile-based language translation and filtration. Based on data provided by UDS 200, translation filter server 140 can be made aware of the current session conditions, e.g., what in-game objects, entities, activities, and events that users have engaged with, and thus support analysis of and coordination of translation and filtration by translation filter server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to translation filter server 140 regarding current session conditions. Translation filter server 140 may therefore use such media files 212 and activity files 216 to determine whether the current session conditions meet any of the trigger conditions of the translation rules associated with the current users of a monitored communication session. For example, the media files 212 and activity files 216 may include references to particular characters, locations, and objects displayed and interacted with in a current gameplay session. Based on such files 212 and 216, therefore, translation filter server 140 may identify such references as game-specific terms and phrases rather than being from another language, thereby being able to better distinguish what language sets in the chat stream are in a preferred language (or languages) of a particular user and what language sets in the chat stream are in a different language. For novice users, some of the terms and phrases may be translated into expanded definitions or explanations, which may include media from or links to the media files 212 and activity files 216. Further, where the trigger conditions may include certain in-game status of the user or other users, the translation filter server 140 may use media files 212 and activity files 216 to evaluate and determine whether such in-game status meets the trigger conditions.

Figure 3:
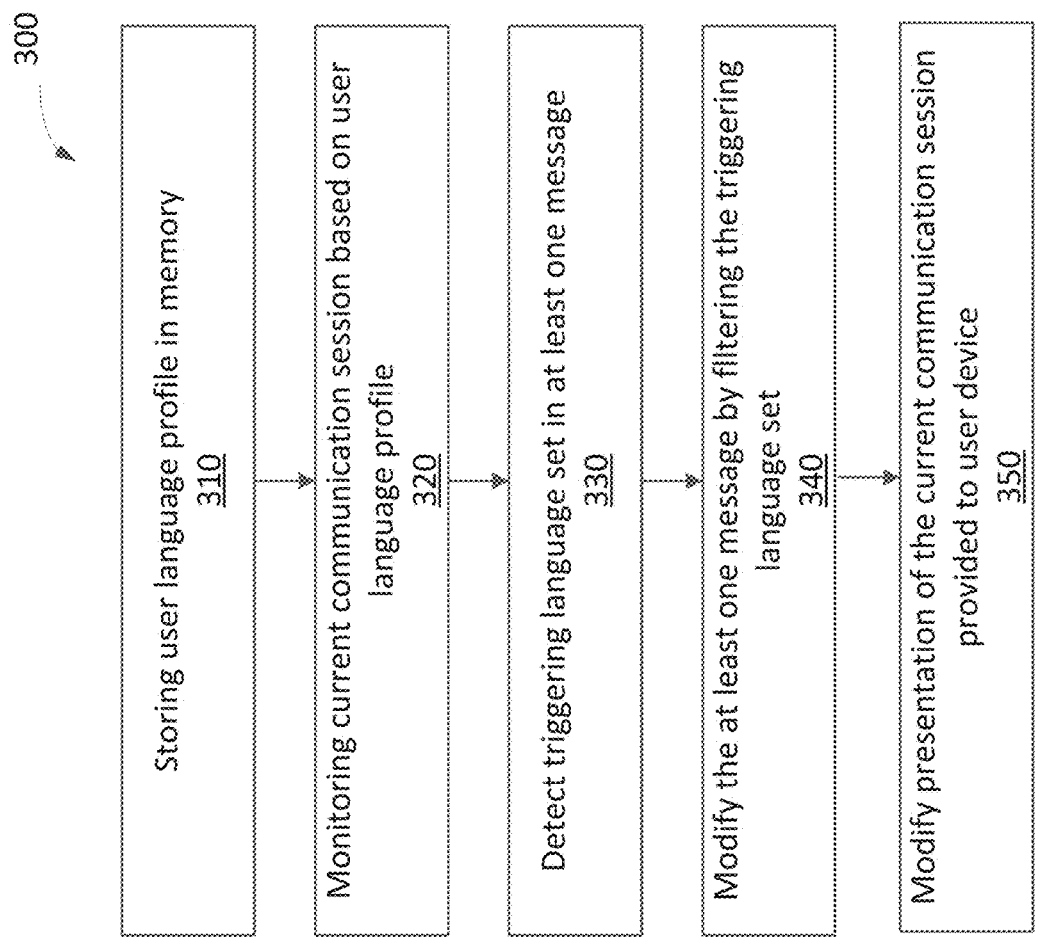
FIG. 3 is a flowchart illustrating an exemplary method for profile-based language translation and filtration.

FIG. 3 is a flowchart illustrating an exemplary method 300 for profile-based language translation and filtration. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, a user language profile may be stored in memory (e.g., databases 160) for a particular user. Different users may be associated different user language profiles, as each user language profile may be customized to the preferences, habits, and histories of the respective user. Each user language profile may include one or more translation rules, each of which may specify one or more trigger conditions associated with one or more translation actions. The trigger conditions may pertain to any condition regarding the user, other users, the messages in a given communication session, and associated content session(s). Meanwhile, the translation actions may include language translation and categorization, definitions and explanations, filtering or replacing language from the communication session, presentation modification, and other modifications to the chat stream.

In step 320, a current communication session may be monitored by translation filter server 140 based on the user language profiles of the participating users. As each user has their own respective user language profile, translation filter server 140 may retrieve the associated user language profiles from databases 160 and use the associated translation rules to monitor a communication session in real-time (or close to real-time). Further, where the associated translation rules may specify trigger conditions involving other or associated sessions (e.g. gameplay sessions), the translation filter server 140 may also obtain media files 212 and activity files 216 associated with the user who specified such trigger conditions. The media files 216 and activity files 216 may be used by translation filter server 140 in conjunction with the conditions of the communication session to determine whether the trigger conditions are met.

In step 330, a language set in a message may be detected as triggering a translation rule associated with a user. As noted above, the language set may trigger the translation rule when the trigger conditions specified by that translation rule are met. Because different users may be associated with different translation rules via their respective different user language profiles, a language set that triggers a translation rule for one user may not trigger the translation rule for another user. In a multiuser communication session where all users have different preferred language(s), for example, different messages may trigger translation for each user.

In step 340, the translation filter server 140 may modify the message detected in step 330 by filtering the triggering language set in accordance with the translation actions of the triggered translation rule. As noted above, such modifications may include adding to, removing, or otherwise changing the triggering language set in the message. In some implementations, such modifications may result in filtering the message in part or entirely out of the chat stream of the communication session.

In step 350, the translation filter server 140 may modify the presentation of the current communication session provided to the user device 150 in accordance with the translation actions of the triggered translation rule. The presentation modification may include changing a presentation type of the triggering message. For example, an audio message may be transcribed and presented as a text-based message, and vice versa. Further, different media elements (e.g., from media files 216, activity files 216, or predefined media specified by translation actions) may be added to or removed from the chat stream before being presented to the specific user associated with the triggered translation rule.

Figure 4:
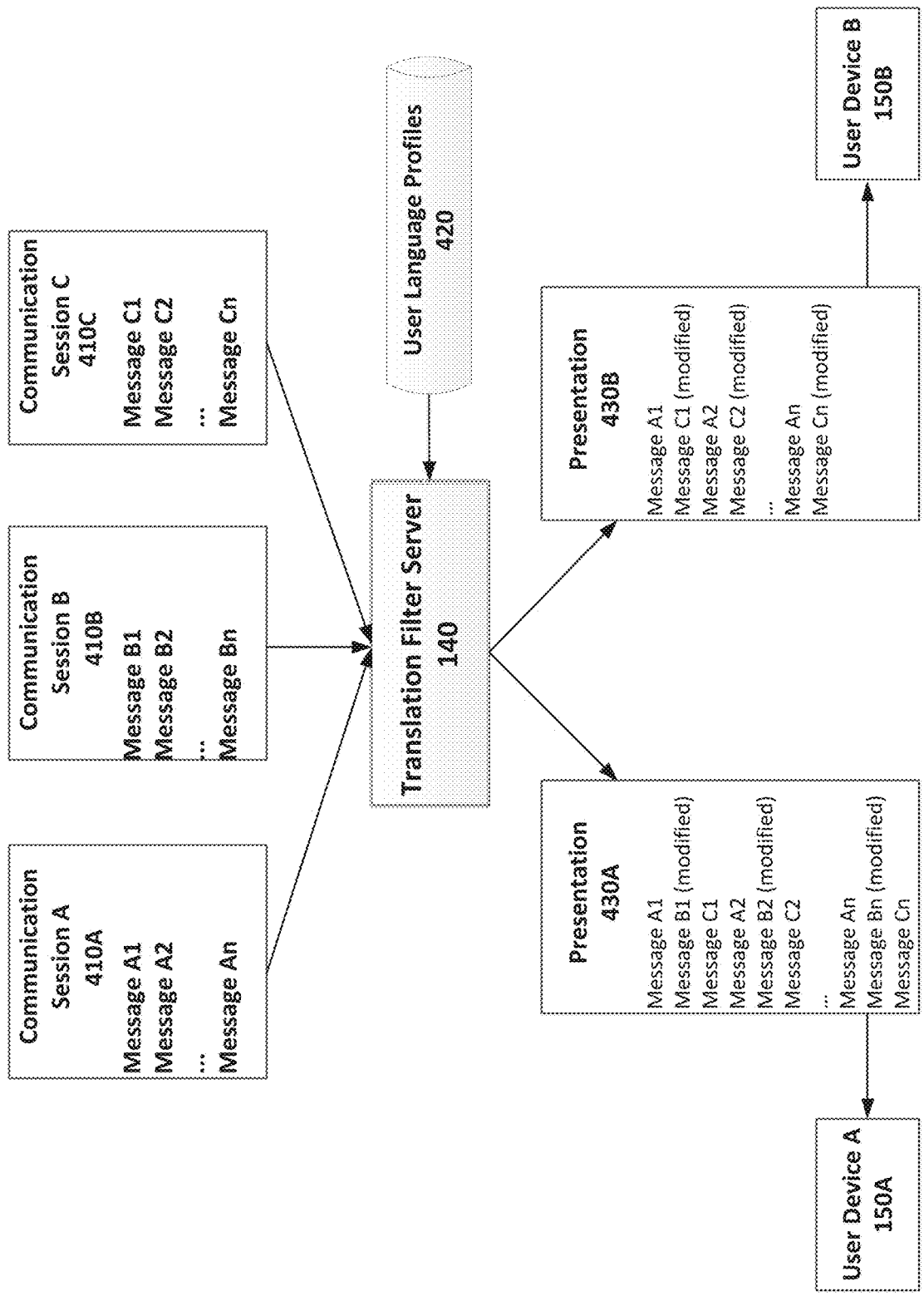
FIG. 4 is a diagram illustrating an exemplary implementation of profile-based language translation and filtration.

FIG. 4 is a diagram illustrating an exemplary implementation of profile-based language translation and filtration. The diagram of FIG. 4 illustrates multiple different communication sessions 410A-C. The communication sessions 410A-C may be associated with a particular content interaction session (e.g., gameplay session of particular game title) or may merely be established and operated concurrently with the content session. The different communication sessions 410A-B may each their own respective messages A1-n, B1-n, and C1-n in any medium known in the art, including text, audio, and video.

The data of the communication sessions 410A-C may be provided to translation filter server 140 for consolidation and translation in accordance with custom user language profiles (as stored and maintained in databases 160 or user language profiles database 420). Although FIG. 4 illustrates only two user devices 150A-B, communication session may include any number of users. In an exemplary implementation, translation filter server 140 may obtain the user language profiles for the users of user devices 150A-B and use the obtained user language profiles to consolidate and translate the messages in a customized matter for each user.

As illustrated, translation filter server 140 may generate and provide one version of chat stream presentation 430A for user device 150A, while generating and providing a different version of chat stream presentation 430B for user device 150B. Further, the chat stream presentation 430A not only include modifications to different messages, but further includes a different set of messages than the chat stream presentation 430B provided to user device 150B. As noted above, the modifications to the specific messages may further include different types of media content than were originally included in the messages. Each user of the user devices 150 may therefore be presented with a customized version of the communication sessions 410A-C in accordance with their respective user language profiles.

Figure 5:
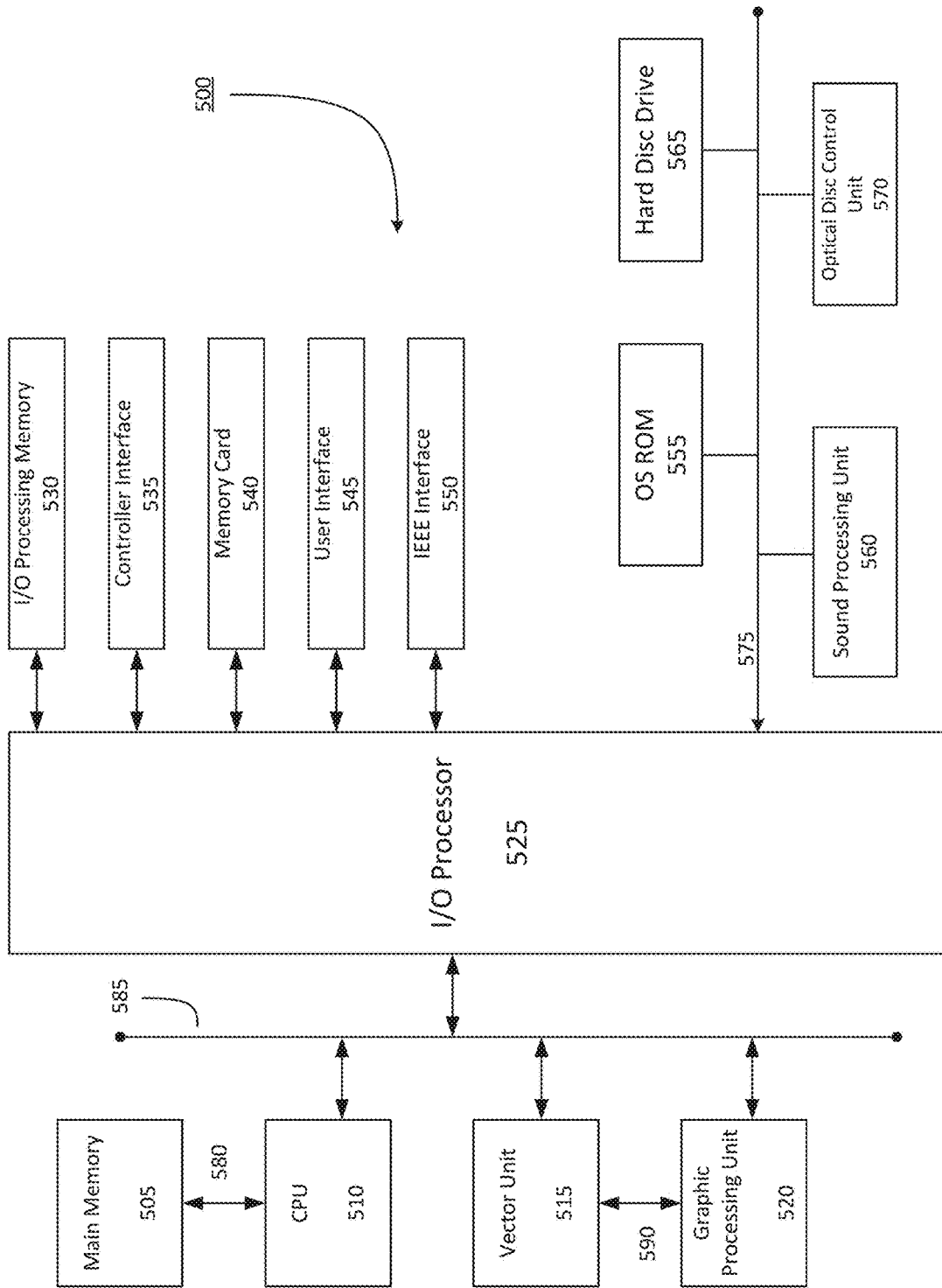
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for profile-based language translation and filtration, the method comprising:
    storing a user language profile in memory for a user, wherein the user language profile specifies one or more translation rules;
    monitoring a plurality of current communication sessions associated with a user device of the user, wherein the current communication sessions include messages from one or more other user devices of one or more other users;

detecting that a language set in at least one of the messages of the current communication sessions triggers at least one of the translation rules in real-time;

filtering the language set in the at least one message in real-time based on the at least one translation rule, wherein the at least one message is modified based on the filtered language set; and modifying a presentation of the current communication sessions that is provided to the user device, wherein the presentation of the current communication sessions is modified to include the filtered language set of the modified message, and wherein modifying the presentation further includes consolidating messages from the plurality of current communication sessions into a single stream.

2. The method of claim 1, wherein the translation rules specify one or more trigger conditions associated with one or more translation actions, wherein the language set is detected as triggering the translation rules when the language set includes at least one of the trigger conditions.

3. The method of claim 2, wherein the translation actions include at least one of adding one or more words to the language set, removing one or more words from the language set, changing one or more words in the language set, modifying a presentation type of the at least one message, and modifying a priority of the at least one message.

4. The method of claim 2, further comprising customizing the trigger conditions based on user input associated with the user.

5. The method of claim 2, wherein the translation action further includes identifying which of the other users is a source of the triggering language set, and updating a trigger status of the identified other user in relation to one or more of the trigger conditions.

6. The method of claim 1, wherein filtering the language set is further based on a game title currently played by the user of the user device.

7. The method of claim 1, further comprising storing a different user language profile for an identified one of the other users in the current communication sessions, wherein a presentation of the current communication sessions is modified in accordance with the different user language profile before being provided to the user device of the identified other user.

8. A system for profile-based language translation and filtration, the system comprising:

memory that stores a user language profile for a user, wherein the user language profile specifies one or more translation rules;

a communication interface that communicates over a communication network, wherein the communication interface monitors a plurality of current communication sessions associated with a user device of the user, wherein the current communication sessions include messages from one or more other user devices of one or more other users; and a processor that executes instructions stored in memory, wherein the processor executes the instructions to:

detect that a language set in at least one of the messages of the current communication sessions triggers at least one of the translation rules in real-time;

filter the language set in the at least one message in real-time based on the at least one translation rule, wherein the at least one message is modified based on the filtered language set; and modify a presentation of the current communication sessions that is provided to the user device, wherein the presentation of the current communication sessions is modified to include the filtered language set of the modified message, and wherein modifying the presentation further includes consolidating messages from the plurality of current communication sessions into a single stream.

9. The system of claim 8, wherein the translation rules specify one or more trigger conditions associated with one or more translation actions, wherein the language set is detected as triggering the translation rules when the language set includes at least one of the trigger conditions.

10. The system of claim 9, wherein the translation actions include at least one of adding one or more words to the language set, removing one or more words from the language set, changing one or more words in the language set, modifying a presentation type of the at least one message, and modifying a priority of the at least one message.

11. The system of claim 9, wherein the processor executes further instructions to customize the trigger conditions based on user input associated with the user.

12. The system of claim 9, wherein the translation action further includes identifying which of the other users is a source of the triggering language set, and updating a trigger status of the identified other user in relation to one or more of the trigger conditions.

13. The system of claim 8, wherein the processor executes further instructions to filter the language set further based on a game title currently played by the user of the user device.

14. The system of claim 8, wherein the memory further stores a different user language profile for an identified one of the other users in the current communication sessions, wherein the processor further modifies a presentation of the current communication sessions in accordance with the different user language profile before being provided to the user device of the identified other user.

15. A non-transitory, computer-readable storage medium, having embodied thereon a program executable by a processor to perform a method for profile-based language translation and filtration, the method comprising:

storing a user language profile in memory for a user, wherein the user language profile specifies one or more translation rules;

monitoring a plurality of current communication sessions associated with a user device of the user, wherein the current communication sessions include messages from one or more other user devices of one or more other users;

detecting that a language set in at least one of the messages of the current communication sessions triggers at least one of the translation rules in real-time;

filtering the language set in the at least one message in real-time based on the at least one translation rule, wherein the at least one message is modified based on the filtered language set; and modifying a presentation of the current communication sessions that is provided to the user device, wherein the presentation of the current communication sessions is modified to include the filtered language set of the modified message, and wherein modifying the presentation further includes consolidating messages from the plurality of current communication sessions into a single stream.

* * * * *